United States Patent [19] [11] Patent Number: 4,820,949
Mizobuchi et al. [45] Date of Patent: * Apr. 11, 1989

[54] ELECTRICALLY POWERED APPARATUS

[75] Inventors: Shotaro Mizobuchi; Toshiya Kanamori; Katsumi Sasaki; Katsutoshi Chiba; Yoshikazu Kimura, all of Kanagawa, Japan

[73] Assignee: Ebara Research Co., Ltd., Tokyo, Japan

[*] Notice: The portion of the term of this patent subsequent to Oct. 13, 2004 has been disclaimed.

[21] Appl. No.: 931,064

[22] Filed: Nov. 17, 1986

[30] Foreign Application Priority Data

Nov. 28, 1985 [JP] Japan ................ 60-268828
Dec. 25, 1985 [JP] Japan ................ 60-290685
Sep. 26, 1986 [JP] Japan ................ 61-227357

[51] Int. Cl.⁴ .................................. H02K 7/09
[52] U.S. Cl. ........................... 310/90; 310/268
[58] Field of Search ............... 310/90, 268, 43, 44

[56] References Cited

U.S. PATENT DOCUMENTS

| 3,179,831 | 4/1965 | Moressee et al. | 310/268 |
| 3,241,304 | 3/1966 | Mattingly et al. | 310/90 X |
| 3,918,773 | 11/1975 | Tuffias | |
| 4,132,910 | 1/1979 | Kiss et al. | 310/268 X |
| 4,408,858 | 10/1983 | Lee | 310/268 X |
| 4,413,895 | 11/1983 | Lee | 310/268 X |

FOREIGN PATENT DOCUMENTS

| 2537758 | 3/1977 | Fed. Rep. of Germany . |
| 3235866 | 5/1983 | Fed. Rep. of Germany . |
| 1226129 | 7/1960 | France . |
| 56-71524 | 6/1981 | Japan . |
| 56-71525 | 6/1981 | Japan . |
| 57-28920 | 2/1982 | Japan . |
| 58-79448 | 5/1983 | Japan . |
| 59-17020 | 1/1984 | Japan . |
| 59-72956 | 4/1984 | Japan . |
| 59-198849 | 11/1984 | Japan . |
| 60-14615 | 1/1985 | Japan . |

Primary Examiner—Patrick R. Salce
Assistant Examiner—Judson H. Jones
Attorney, Agent, or Firm—Wenderoth, Lind & Ponack

[57] ABSTRACT

An electrically powered apparatus is disclosed in which an axial end surface of a rotor and an axis end surface of a stator are arranged to be sliding surfaces for effecting relative sliding motion therebetween, one of the sliding surfaces being provided with grooves adapted to generate fluid dynamic pressure upon relative rotation of said surfaces.

5 Claims, 7 Drawing Sheets

ELECTRICALLY POWERED APPARATUS

FIELD OF INVENTION

The present invention relates to an electrically powered apparatus and in particular to an electrically powered apparatus having a flat structure comprising a rotor and a stator with a magnetic gap therebetween in the axial direction of the rotary axis of the rotor wherein no drive shaft for transmitting rotational power is required.

BACKGROUND OF INVENTION

Figure 11:
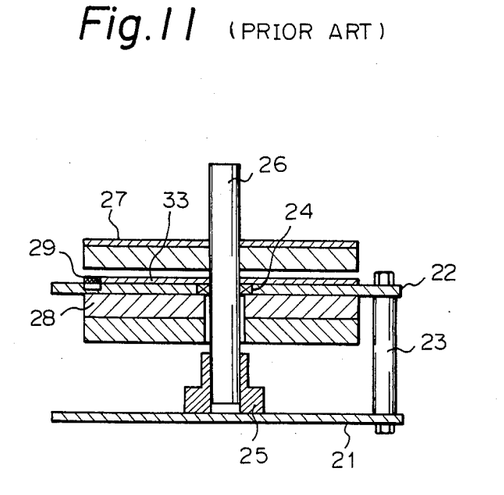
FIG. 11 shows an apparatus according to the prior art.

FIG. 11 is a vertical sectional view illustrating a brushless flat motor which is an example of an electrically powered apparatus according to prior art. A base 21 and a base plate 22 for attaching a stator coil are connected together by stator bolts 23 to provide a frame construction. A rotor 27 having a rotor magnet fixed thereto is secured to a motor shaft 26 rotatably supported by bearings 24 and 25 which are fixed to the base 21 and the base plate 22 respectively. A stator coil 28 is secured to the base plate 22 in relation to the rotor 27 with the base plate 22 therebetween and secured to the base plate 22 are a tachogenerator 33 to be activated by the rotor 27 and a Hall element 29 adapted to control the rotational speed of the rotor. A construction similar to the above may also be applied to a sheet coil motor having a motor coil manufactured by a photoetching method to allow the stator bolts to be made very thin.

The electrically powered apparatus of the construction explained above may be utilized in many ways, for example, as a laser scanner with a polygon mirror fixed to the motor shaft 26, an optical disc driving means with an optical disc removably attached directly to the rotor 27 or a blower with the blades of a fan fixedly mounted to the rotor 27.

In the electrically powered apparatus constructed as above, the clearance of the bearings 24 and 25 in the radial direction is so large that the rotor 27 may be vibrated, particularly where ball bearings are used for the bearings 24 and 25, and and vibration may thus be caused, such vibration causing problems in tape recorders and VTR which are susceptible to vibration.

In addition, it is to be noted that there are no radial bearings available which display good resistance to corrosion without the use of sealing means and they thus cannot be used in a submerged condition. Such bearings also exhibit poor resistance characteristics under circumstances where dew is a frequent occurrence.

It is further to be noted that when the motors are to be utilized in electric appliances, uneven rotation causes problems, and since the frictional resistance varies considerably in the case of radial bearings, uneven rotation may result.

For electrically powered apparatus of the sort described above, it is preferable in many cases that such apparatuses be short in axial length, as well as being thin. However, the motor cannot be made thin unless the distance between the radial bearings 24 and 25 can be made short. Conversely if the distance between the radial bearings is made short, the radial load to be supported by the bearings will be increased and the possibility of tilting of the motor shaft will also be increased due to the clearance existing in the bearings.

It is further to be noted that with the electrically powered apparatus of the type described above, the thrust load is always applied by the magnet of the rotor, and the metallic balls and the retainer of the ball bearings are subjected to permanent deformation if the apparatus is left unused for a long period of time, making it impossible for the apparatus to be started again. It is also to be noted that when the electrically powered apparatus is used for a high speed laser scanner which is adapted to reproduce an image of high resolution, the motor shaft 26 as well as the bearings 24 and 25 have to be machined extremely precisely, so as to minimize deflection of the plane of the polygon mirror, and at the same time they have to be assembled with the polygon mirror with high precision.

SUMMARY OF INVENTION

An object of the present invention is to provide an electrically powered apparatus having a rotor and a stator arranged in such a manner as to provide a magnetic gap in the axial direction of the rotating axis of the rotor, characterized in possessing a simple construction and high durability.

Another object of the present invention is to provide an electrically powered apparatus which will possibly minimize any vibration of the rotor and deflection of the plane of the rotor. A further object of the present invention is to provide an electrically powered apparatus which is efficient in respect of both durability and resistance against abrasion and which is capable of being applied in a wide range of environmental conditions including utilization within air, liquid, and so forth.

The present invention provides an electrically powered apparatus in which a stator is arranged in such a manner as to oppositely face the end surface of a rotor in the axial direction of the rotary shaft, characterized in that a sliding surface on the rotary side is provided on the end surface of the rotor oppositely facing the stator, the front surface of the stator oppositely facing the sliding surface is formed as a bearing surface on the stationary side, the sliding surface on the rotary side and the bearing surface on the stationary side are respectively made of hard ceramic materials, one of the sliding or bearing surfaces on the rotary or stationary sides being formed as a smooth plane with the other of the surfaces being formed as a plane provided with grooves adapted to generate fluid dynamic pressure.

The second embodiment of the present invention provides an electrically powered apparatus wherein the opposite end surfaces of the rotor in the axial direction of the rotary axis of the rotor are respectively formed to be rotary side sliding surfaces, a stator is arranged in such a manner as to oppositely face one of the sliding surfaces, and a rockable bearing surface is arranged in such a manner as to oppositely face the other of the sliding surfaces, characterized in that the front surface oppositely facing the sliding surface on the rotary side is formed as a bearing surface on the stationary side, and the two rotary side sliding surfaces and the two bearing surfaces oppositely facing the sliding surfaces are respectively made of hard ceramic materials, one of the two surfaces constituting sliding portions formed at the opposite end surfaces of the rotor in the axial direction of the rotary axis being formed with grooves adapted to generate fluid dynamic pressure, the other of the surfaces being formed as a smooth plane.

The third embodiment of the present invention further provides an electrically powered apparatus wherein the opposite end surfaces of the rotor in the axial direction of the rotary axis are respectively formed to be the rotary side sliding surfaces, a stator is arranged in such a manner as to oppositely face one of the sliding surfaces on the rotary side and a rockable bearing surface is arranged in such a manner as to oppositely face the other of the rotary side sliding surfaces, characterized in that a rotationary shaft extending along the rotary axis of the rotor is fixedly mounted on the stator, and a through-hole is formed centrally of the rotor corresponding to the stationary shaft to form a radial bearing, and the surface of the stator oppositely facing the rotary side sliding surface is formed as a bearing surface on the stationary side, the two sliding surfaces on the rotary side and the two bearing surfaces oppositely facing the sliding surfaces being respectively made of hard ceramic materials, one of the two surfaces constituting the sliding portions formed at the opposite end surfaces of the rotor in the axial direction of the rotary axis being provided with grooves adapted to generate fluid dynamic pressure, and the other of the surfaces being formed to be a smooth plane.

In the electrically powered apparatus according to the present invention, since the sliding portions defined between the rotor and the stator are respectively made of hard ceramic materials and one of the sliding portions is formed with grooves adapted to generate fluid dynamic pressure, dynamic pressure of the fluid is generated at the sliding portions through rotation of the rotor, and the rotor is caused to rotate in a floating condition, resulting in a fairly small sliding resistance.

Further, the rotor may be prevented from deflection by the damping effect provided by the fluid film formed between the sliding portions.

In the second embodiment of the present invention, deflection of the rotor may be further minimized because the opposite end surfaces of the rotor in the axial direction of the rotary axis are sustained respectively by the sliding portions having damping effects.

Further, in the third embodiment of the present invention, wherein sliding portions adapted to sustain the radial load are defined between the through-hole provided centrally of the rotor and the stationary shaft, the sliding resistance is also small because a fluid film is formed there in the same manner as described above.

The present invention will be further clarified if the ensuing description is reviewed in combination with the accompanying drawings, a brief explanation thereof being summarized below.

DETAILED DESCRIPTION OF PREFERRED EMBODIMENTS

Embodiments of the present invention will now be explained by referring to the accompanying drawings.

Figure 1:
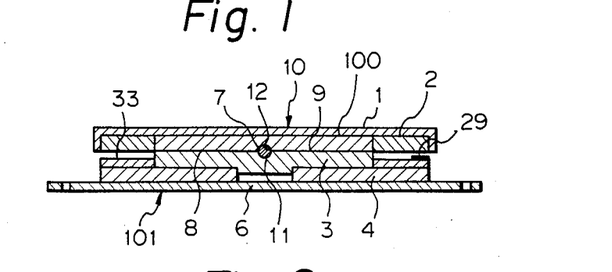
FIG. 1 is a vertical sectional view showing an embodiment of the present invention.

FIG. 1 is a vertical sectional view showing a brushless flat motor of a normal type wherein a rotary side sliding surface is formed at one of the end surfaces of a rotor 10 in the axial direction of the rotary axis. The rotor 10 consists of an iron yoke 1 of a disc-like construction having a circular flat surface, an annular permanent magnet 2 fitted in and secured to the yoke 1 and a plate 100 of ceramic material fixedly mounted on the yoke 1 and the permanent magnet 2 at the inner periphery of the permanent magnet 2. The permanent magnet 2 is magnetized with a plurality of magnetic poles which are arranged annularly and equidistantly. Hard ceramic materials are used for the plate 100, such as fine and dense ceramic materials containing for example $\beta$-SiC, $\alpha$-SiC, $Si_3N_4$ or the like. The surface 9 on the side of the rotor is a smooth plane formed with grooves adapted to generate fluid dynamic pressure. More specifically, the sliding surface 9 on the rotary side facing the stator is machined to have a flatness within a tolerance of 1 $\mu$m over the entire surface thereof and is provided with spiral grooves having a depth of 3-50 $\mu$m adapted to generate fluid dynamic pressure. At the position of the rotor 10 corresponding to the rotary axis is formed a semi-spherical recess 12.

The stator side will next be described. A stator coil 4 is fixed to a stationary plate 6 which is in turn fixedly mounted on the stationary side member (not shown) by means of screws. On the stator coil 4 is fixedly mounted a stationary side bearing 3 which is made of a hard ceramic material.

Figure 2:
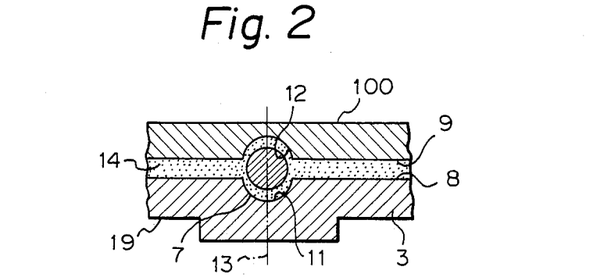
FIG. 2 is a partially enlarged view of FIG. 1.

The stator coil 4 comprises a plurality of sheet coils bonded and fixed together. To the stator coil 4 are integrally fixed a Hall element 29 adapted to detect the magnetic poles of the permanent magnet 2 of the rotor 10 and a tachometer 33 adapted to detect the rotational speed of the rotor 10. The surface 8 of the stationary side bearing 3 fixed to the stator coil 4 corresponding to the sliding surface 9 at the rotary side of the rotor 10 is also machined to provide a smooth and non-undulating plane in a similar manner to the rotor. A semi-spherical recess 11 is also formed at the position of the stator corresponding to the rotary axis of the rotor. The space defined by the two recesses 11 and 12 accommodates a small ball 7 which is made of plastic material, metallic material or ceramic material and is adapted to sustain a small radial load. FIG. 2 is an enlarged view of the central portions of the rotary side sliding surface 9 and the stationary side bearing surface 8 shown in FIG. 1.

The space defined by the semi-spherical recesses 11 and 12 formed respectively along the rotary axis 13 of the rotor is substantially spherical and the ball 7, which is smaller in diameter than the space, is accommodated therein. There is substantially no space left between rotary side sliding surface 9 of the plate 100 made of ceramic material and the stationary side bearing surface 8 of the stationary side bearing 3 when the rotor 10 is at rest or when they are in abutment with each other. However, when the rotor 10 starts to rotate, dynamic pressure of the fluid 14 is generated at the sliding portions causing the rotor 10 to float up. The floating height of the rotor 10 depends on various factors such as the viscosity of the fluid existing at the sliding portions, the rotational speed of the rotor 10, the thrust load imposed on the sliding portions, the configurations of the grooves adapted to generate fluid dynamic pressure, etc. In practice, the viscosity of the fluid has a particularly major influence.

Figure 3:
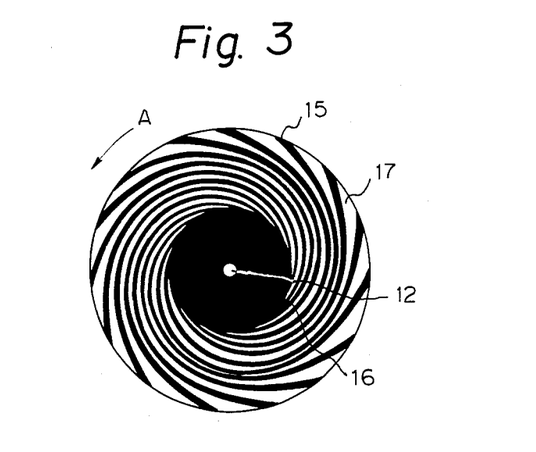
FIG. 3 is a plan view of spiral grooves formed on a rotor surface shown in FIG. 1.

FIG. 3 shows the front view of the rotary side sliding surface 9 in which spiral grooves 15 in one direction are formed on the circular plate 100 of ceramic material. The central portion 16 of the ceramic plate is recessed to the same depth as that of the grooves 15. The central portion 16 may alternatively be the same height as that of the smooth plane represented by the land portions 17 adjacent to the spiral grooves 15 or may be machined deeper than the depth of the spiral grooves 15. However, it is to be noted that the area of the land portions 17 which comprise the protruding portions on the rotary side sliding surface 9 is preferably minimized because they may otherwide require a larger starting torque in an electrically powered apparatus of this sort.

In FIG. 3, the arrow A indicates the direction of rotation of the rotor 10. Since the rotary side sliding surface 9 is rotated together with the rotor 10, the fluid 14 is caused to flow in from the outer periphery of the rotor toward the central portion 16 by means of the spiral grooves 15. In the spiral grooves 15, a high fluid dynamic pressure is generated as the fluid moves from the outer peripheral end to the inner peripheral end and at the central portion 16 the fluid pressure is uniformly distributed. The magnitude of the fluid dynamic pressure generated in the grooves is in proportion to the amount of force acting to depress the rotor 10 toward the stator 101. The rotor 10 and the stator 101 rotate with a small sliding resistance owing to the fluid film formed therebetween.

The portions which protrude most from the rotary side sliding surface 9 are the land portions 17 and the undulations of the respective land portions over the entire surface are within 1 μm. The protruding portions at the stationary side bearing surface 8 are the smooth bearing surfaces which have undulations restricted to within 1 μm over their entire surface area also.

It is further to be noted that due to the small clearance between the rotary side sliding surface 9 and the stationary side bearing surface 8, the fluid pressure between the sliding portions defined between the surfaces has a damping effect which restricts abrupt variation in respect of the space defined at the sliding portions. Consequently, when the rotor 10 rotates, vibration of the rotor 10 in the axial direction of the rotary axis is limited to a small amount. As explained above, since the clearance at the sliding portions is so small and stable that the clearance between the permanent magnet 2 of the rotor 10 and the stator coil 4 is also made small, the magnetic field generated by the stator coil 4 can be effectively transmitted to the rotor 10. The stationary plate 6 opposite the coil 4 may be made of silicon steel in order to prevent leakage of the magnetic flux.

It is to be understood here that since the hard ceramic material to be used for the bearing 3 on the stationary side which is arranged between the stator coil 4 and the permanent magnet 2 is to be inserted in the rotary magnetic field, it is preferable that it have a large electric resistance in order to minimize the eddy current loss and for this reason $Si_3N_4$ or $\alpha$-SiC with BeO added are preferable for use among possible ceramic materials.

With further reference to FIG. 1, the stationary side bearing surface 8 may be used as the surface on which grooves adapted to generate fluid dynamic pressure are formed. In this case, the rotary side sliding surface 9 oppositely facing the bearing surface 8 will be left as a smooth plane surface.

Figure 4:
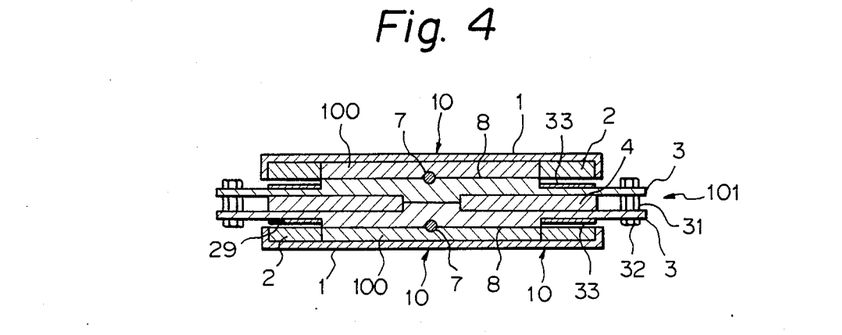
FIG. 4 is a vertical sectional view showing another embodiment of the present invention.

FIG. 4 is a sectional view illustrating another embodiment of the present invention which is capable of generating power at opposite ends thereof.

The coil 4 on which sheet coils are laminated is fixed on the opposite surfaces by two stationary side bearing surfaces 3, 3 made of ceramic materials. The stationary side bearing surfaces 3, 3 have central bearing surfaces 8, 8 which are smooth planes. The tachometers 33 are extended from the central bearing surfaces 8 in such a manner as to avoid contact with the oppositely facing surfaces of the rotors 10.

In FIG. 4, the position of the permanent magnet 2 attached to the underside of the rotor 10 is detected by the Hall element 29 and the lower rotor 10 is caused to rotate by energization of the coil 4 by the control device (not shown). The magnetic flux generated by the coil 4 at this instance will also appear at the upper side of the coil 4, which will also cause the upper rotor 10 to rotate.

However, the upper and lower rotors 10 have poles of opposite polarity. As a result, the rotors 10, 10 will be attracted to each other and consequently the two rotors 10, 10 may be held by the stator without providing a special fixing means.

It is to be noted that the small ball 7 substantially serves as a radial bearing. The small ball 7 displays the effect of preventing the rotors 10, 10 and the stator 101 from moving in the radial directions and also serves as a reference means for positioning. As the small ball mentioned above, an iron ball, a stainless steel ball or a ceramic ball, etc. may be employed and in addition, with regard to the configuration, various configurations such as a cylinder, a double cone or the like may be utilized.

The main reason that hard ceramic materials are used for constituting the sliding portions according to the present invention is that the grooves adapted to generate fluid dynamic pressure may then be produced with high precision and the sliding portions may be given a configuration which is suitable for generating fluid dynamic pressure and this may be maintained when the fluid dynamic pressure has been actually generated, the sliding portions being sufficiently durable to withstand the sliding abrasion between solid materials generated at the time when the electrically powered apparatus is started up or stopped if the load caused thereby is limited to a certain degree.

With regard to the method of machining the grooves for generating the fluid dynamic pressure on the surface made of hard ceramic material, plastic maskings corresponding to the land portions are applied to the surface made of ceramic material which is finished to be a smooth plane or plastic materials are applied to the portions corresponding to the land portions by means of a screen printing method or the like and then cured. Subsequently, particles of $Al_2O_3$, SiC or the like are directed against the exposed ceramic material portions by means of pressurized air in the form of a shot blast. After the shot blasting process, the plastic material layer on the ceramic surface will have been removed. The land portions may thus be restored to the state of the smooth plane while the grooves may be machined surfaces having an aventurine appearance. It is also to be understood that the grooves may be provided in a similar manner by the shot blasting method as explained above when the radial bearings which make use of the fluid dynamic pressure effect described below are to be provided.

The various configurations of the electrically powered apparatus according to the present invention may be utilized in various application fields including a polygon mirror formed with a polyhederal mirror at the outer periphery on a rotor and a driving means for driving a magnetic disc or a photo disc which incorporates a means for detachably fixing the disc at the upper part of the surface of the rotor.

Figure 5:
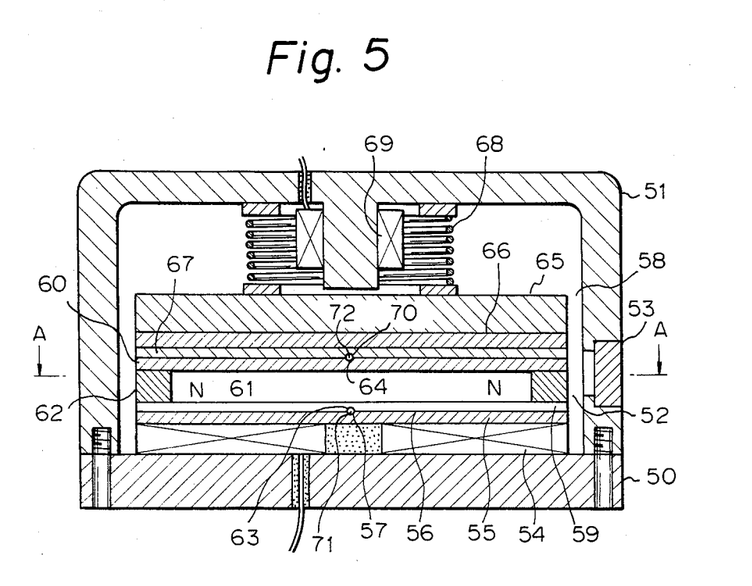
FIG. 5 is a vertical sectional view showing a further embodiment of the present invention.

FIG. 5 is a vertical sectional view showing the electrically powered apparatus according to the second embodiment of the present invention, this apparatus being used as the driving means of a polygon mirror.

In FIG. 5, numeral 50 designates the support plate to be fastened to a stationary member (not shown). A cap 51 is arranged on the support plate 50 and screwed thereto for isolating the rotary members in the cap from the surrounding environment. A glass window 53 is provided on the cap at the position corresponding to a polygon mirror 52 inside the cap.

To the support plate 50 is fixed a stator coil 54 and, on the upper surface of the coil 54, the stationary side bearing 55 is secured, the bearing 55 comprising a circular plate made of ceramic material having the front face finished to a smooth plane 56. The smooth plane 56 serves as the bearing surface on the stationary side. At the position on the bearing surface 56 corresponding to the rotary axis of the polygon mirror 52 is formed a semi-spherical recess 57 and on the outside of the recess 57 are formed grooves adapted to generate fluid dynamic pressure. Above the stationary side bearing 55, a polygon mirror 52 is rotatably installed and above the polygon mirror 52 is provided a pressure plate 58.

The polygon mirror 52 is so constructed that a permanent magnet 61 and a mirror portion 62 are fixedly mounted between a lower sliding plate 59 made of a hard ceramic material disposed on the rotary side and facing the stator coil 54 and an upper sliding plate 60 made of a hard ceramic material disposed on the rotary side and facing the pressure plate 58. The front surfaces of the upper and lower sliding plates 59, 60 on the rotary side are similarly ground to form a smooth plane with little undulation and are respectively provided with semi-spherical recesses 63, 64 at positions corresponding to the rotary axis of the polygon mirror 52. The pressure plate 58 is constructed of a back plate 65 made of iron, a rubber plate 66 and a bearing plate 67 made of a hard ceramic material, the three plates 65, 66, 67 being laminated and adhered together with the bearing plate 67 oppositely facing the polygon mirror 52.

Further, the back plate 65 and the cap 51 are resiliently connected by means of a spring 68, so as to urge the pressure plate 58 against the polygon mirror 52. Inside the spring 68 is provided a solenoid 69 which when energized causes the pressure plate 58 to be attracted to the solenoid 69 whereby the force acting to press the back plate against the polygon mirror 52 may be mitigated or dissipated.

The front surface (the lower side surface as viewed in the drawing) of the bearing plate 67 is formed as a smooth plane with little undulation and with grooves having a depth of from 3–50 μm adapted to generate fluid dynamic pressure, as well as having a semi-spherical recess 70 formed at a postion corresponding to the rotary axis of the polygon mirror 52.

The recesses 57, 63 and 64, 70 respectively face each other and the substantially spherical spaces defined by these recesses accommodate small balls 71, 72 respectively made of hard materials (such as ceramic or metallic materials).

Figure 6:
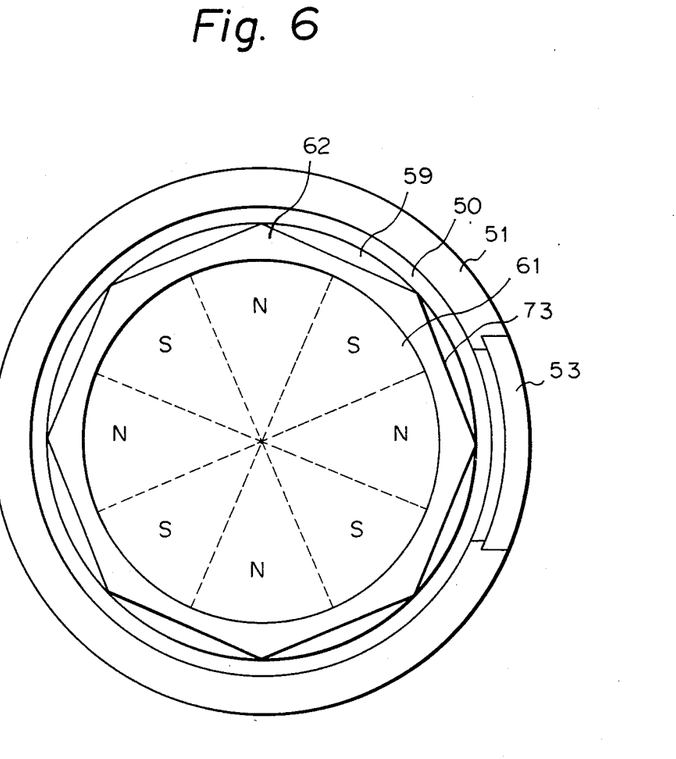
FIG. 6 is a sectional view taken along the line A—A in FIG. 5.

FIG. 6 is a horizontal sectional view taken along the line A—A in FIG. 5. The permanent magnet 61 has a circular configuration and has eight magnetic poles magnetized in an annular arrangement. At the outer periphery of the permanent magnet, the mirror portion 62 is formed. Portions of the mirror portion 62 adapted to reflect laser beams are provided at the side portions 73 of the regular polygon of the mirror portion. The respective sides are finished to provide mirror surfaces each having a high reflection index. With respect to FIG. 5 and FIG. 6, when the polygon mirror 52 is rotated, the solenoid 69 is energized, the pressure plate 58 is slightly lifted up and then the stator coil 54 is connected to the power source. Since the circuit for detecting the rotational speed of the polygon mirror and the elements for detecting the magnetic poles are provided at the upper surface of the stator coil 54 in the same manner as the preceding embodiment, the most appropriate coil may be energized by the drive control apparatus (not shown) in accordance with the output signals provided by the circuit and elements, so that the polygon mirror 52 may be caused to rotate at a desired rotational speed. It is to be noted here that since the solenoid 69 will be de-energized before the rotational speed of the polygon mirror 52 reaches the rated speed, the polygon mirror 52 may be rotated under conditions in which the pressure plate 58 is depressed by the urging influence of the spring 68 and the fluid film is formed at the sliding portions between the opposite ends of the polygon mirror 52 in the axial direction of the rotary axis.

In this embodiment, the damping effect provided by the fluid film formed between the opposite surfaces of the polygon mirror 52 will restrict deflection of the polygon mirror, which is in this case the rotor, in the direction of the rotary axis. Further since the mirror portion 62 of the polygon mirror 52 is of a regular polygonal configuration the sides of which are substantially in internal contact with the outer peripheral edges of the upper and lower sliding plates 59, 60, the mirror portion 62 it is not likely that the polygon mirror 52 will contaminated when handled.

Figure 7:
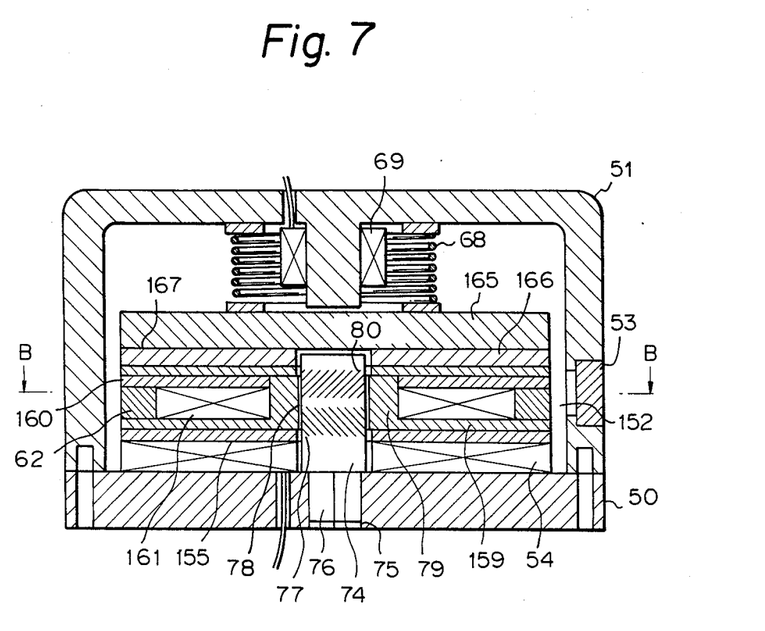
FIG. 7 is a vertical sectional view showing a still further embodiment of the present invention.
Figure 8:
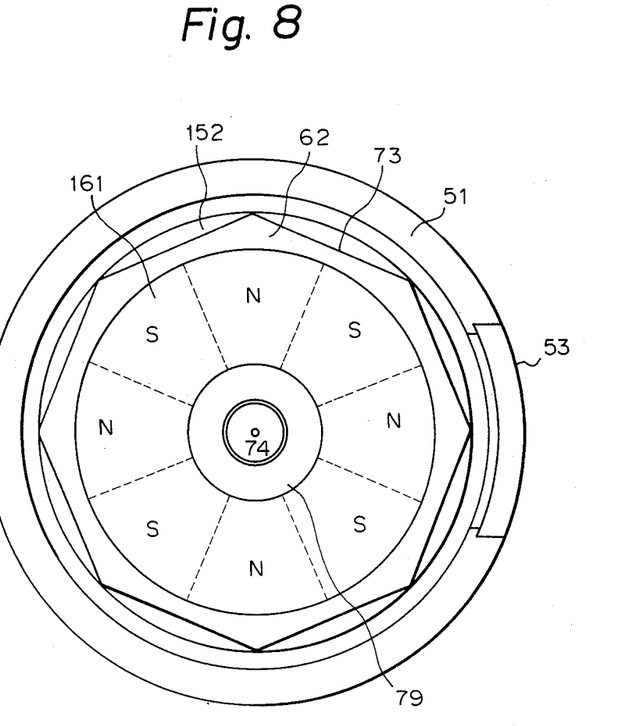
FIG. 8 is a sectional view taken along the line B—B in FIG. 7.

FIG. 7 and FIG. 8 illustrate the third embodiment of the present invention. FIG. 7 is a vertical sectional view of the means to drive the polygon mirror. FIG. 8 is a horizontal sectional view taken along the line B—B in FIG. 7. In FIG. 7, those members which are common to those in FIG. 5 are denoted by the same reference numerals and similar members are denoted by corresponding numerals with 100 added thereto, respectively.

Referring to FIG. 7, the cap 51 is screwed to the support plate 50 and the end portion 76 of the stationary shaft 74 made of a hard ceramic material is fitted in and secured in the central through-hole 75 of the support plate 50. On the outside of the stationary shaft 71 is disposed a stator coil 54 in an annular arrangement. The stator coil 54 is also secured to the support plate 50 by adhesive or a known fastening means. At the upper surface of the stator coil 54 or the surface facing the polygon mirror 152 is fixedly attached a bearing 155 at the rotary side of an annular disc made of a hard ceramic material. The surface of the rotary side bearing facing the polygon mirror 152 is finished to provide a smooth plane with little undulation and has grooves having a depth of 3-50 μm adapted to generate a fluid dynamic pressure formed thereon. Further, the surface of the stationary side bearing and the axis of the stationary shaft 74 are fixed in the direction normal to each other.

A polygon mirror 152 is formed with sliding surfaces on the rotary side at the opposite end surfaces in the direction of the rotary axis. An upper rotary side sliding plate 160 and a lower rotary side sliding plate 159 are respectively made of hard ceramic materials. It is to be noted in particular that the lower rotary side sliding plate 159 is made integral with a rotary sleeve 79 of the polygon mirror 152. The inner circumferential surface of the rotary sleeve 79 is made to be a smooth cylindrical surface and maintained properly in the direction normal to the surface of the rotary side sliding plate 159 which faces the stator coil 54. The portion of the stationary shaft 74 corresponding to the rotary sleeve 79 of the polygon mirror 152 is formed with grooves 80 adapted to generate a fluid dynamic pressure. As for the depth of the grooves 80 which are arranged in a herringbone configuration, 3-15 μm is suitable. The clearance between the stationary shaft 74 and the rotary sleeve 79 is preferably in the range of 2-3 μm at each side, respectively. A fluid film formed by the relative rotational movement between the stationary shaft 74 and the rotary sleeve 79 for sustaining the radial load is desirably generated so long as the sliding surfaces of the stationary shaft 74 and the rotary sleeve 79 are kept properly in parallel. However, in this embodiment since the length of the rotary sleeve 79 of the polygon mirror 152 (substantially equal to the thickness of the polygon mirror 152) is so short, the outer circumferential surface of the stationary shaft 74 and the inner circumferential surface of the rotary sleeve 79 may be worked more easily than in the prior art and therefore high machining precision may be attained.

It is to be understood that the mirror portion 62, the upper rotary side sliding plate 160, the permanent magnet 161 and the lower rotary side sliding plate 159 (including the rotary sleeve 79) are integrally adhered together, and the upper rotary side sliding plate 160 is polished to attain good parallelism in relation to the upper and lower sliding plates on the rotary side. They are then adjusted for balancing.

FIG. 8 is a sectional view taken along the line B—B in FIG. 7. The permanent magnet 161 has eight magnetic poles which are magnetized and arranged annularly and the outer peripheral edge of the mirror portion 62 has the configuration of a regular octagon.

Figure 9:
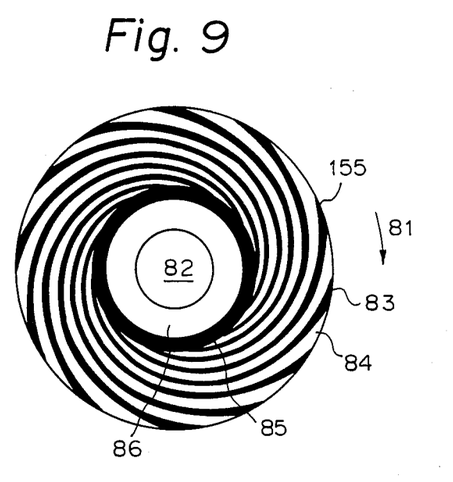
FIG. 9 and FIG. 10 show further embodiments of a portion of the apparatus shown in FIG. 7.

FIG. 9 illustrates a pattern of the stationary side sliding surface of the bearing 155 fixedly attached to the upper surface of the stator coil 54.

The arrow 81 designates the direction of rotation of the polygon mirror 152 and numeral 82 designates a through-hole extending through the stationary shaft 74. On the front surface of the stationary side bearing 155 are alternatively formed around the entire circumference grooves 84 of spiral configuration indicated by a black pattern for generating fluid dynamic pressure and land portions 84 of spiral configuration. The inner peripheral ends of the grooves are respectively in communication with each other through a groove 85 by virtue of which the pressure becomes uniform. On the inner side of the pressure equalizing groove 85 is formed a land 86. The land portions 84, 86 are located in the same plane.

As a result, when the polygon mirror rotates in the direction indicated by the arrow 81, the fluid (air) around the polygon mirror is subjected to the force directed from the outer periphery side to the inner periphery side of the spiral groove 83 and fluid dynamic pressure is generated at the sliding portions.

Figure 10:
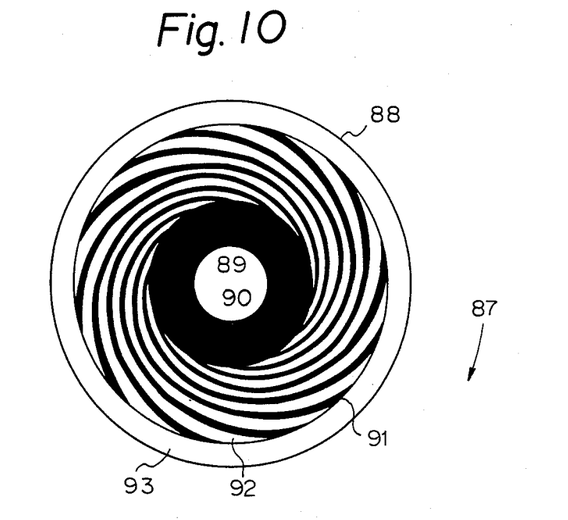

FIG. 10 illustrates an example of grooves adapted to generate fluid dynamic pressure which is suitable for a polygon mirror adapted to be rotated at a high rotational speed, the grooves being formed on the rotary side sliding surface. The arrow 87 designates the direction of rotation of the polygon mirror. Centrally of the rotary side sliding plate 88 is formed a through-hole 89 through which the stationary shaft extends and the inner circumferential surface 90 of the through-hole 89 serves as a rotary sleeve. On the front surface of the rotary side sliding plate 88 are formed grooves 91 of a spiral configuration adapted to generate fluid dynamic pressure (designated by the black pattern) and land portions 92 adjacent to the grooves are finished to a smooth plane. A continuous land portion is also provided around the entire circumference of the outer peripheral edge 93 of the sliding plate 88 on the rotary side. When the polygon mirror rotates in the direction indicated by the arrow 87, centrifugal force generated by the spiral grooves 91 causes the fluid to flow from the inner periphery side of the grooves to the outer periphery side and the fluid pressure will be confined by the land portion 93 circumferentially extending around the outer periphery. As a result, larger fluid dynamic pressure will be generated toward the outer periphery side of the spiral grooves 91.

In a case where the pattern of the grooves for generating fluid dynamic pressure of the type shown in FIG. 10 is to be employed, the fluid therein will be caused to flow as a whole from the central portion to the outer periphery of the grooves. Accordingly, at the central portion of the pressure plate 58 and/or the central portion of the stator coil 54 is defined a passage for making the pressure uniform which is in communication with the atmosphere at the outer periphery of the grooves. Thus the fluid has to be replenished.

According to the present invention, in an electrically powered apparatus in which a stator is arranged to oppositely face the end surface of the rotor in the axial direction of the rotary axis, since a fluid dynamic pressure bearing in a flat plate form made of a hard ceramic material is provided at the sliding portions of the rotor and the stator, the following effects may be expected.

1. An electrically powered apparatus may be constructed which is compact and light in weight, and also having a long serviceable life.

2. Resistance to abrasion and corrosion at the thrust bearing part can be improved, so that maintenance is simple.

3. The electrically powered apparatus may be used not only in liquid but also in a gas or even in a slurry.

4. The frictional coefficient against sliding abrasion at the thrust bearing part is less than 0.001 and, thus, power loss at the bearing may be reduced to the minimum.

5. A flat motor may be provided.

6. Various kinds of electrically powered apparatuses of simple construction may be constituted by fixedly attaching the functional members such as blades, reflection mirror and the like to the rotor or making them integral with the rotor.

In addition to the effects outlined above, the following effect is also provided in the second embodiment.

7. Since the bearings for sustaining the fluid dynamic pressure made of hard ceramic materials are provided at the opposite ends of the rotor in the axial direction of the rotary axis, the rotor is caused to rotate while being subjected to the damping effect provided by both sliding surfaces and thus the degree of deflection of the rotor will be extremely small.

As far as the third embodiment is concerned, the following effects are provided in addition to the above-mentioned effects 1 through 7.

8. Since the radial bearing constituted by the through-hole formed at the central portion of the rotor and the stationary shaft extending through the through-hole has a length in the direction of the rotary axis which is rather short, working accuracy may be enhanced and also a large fluid dynamic pressure may be obtained.

9. The radial bearing can be machined easily.

10. If the thrust bearings formed at the opposite ends of the rotor in the direction of the rotary axis are bearings for fluid dynamic pressure in which the fluid is forced from the outer periphery to the inner side, or are of the so-called "pump-in" type, the pressure of the fluid at the radial bearings may be increased, namely the fluid dynamic pressure effect of the radial bearings may be enhanced greatly.

11. If one of the thrust bearings formed at the opposite ends of the rotor in the direction of the rotary axis is of the above-mentioned "pump-in" type and the other is of the "pump-out" type, the fluid existing at the sliding portions will be caused to flow in one direction whereby cooling of the stator coil and the sliding portions may be effected.

12. If the electrically powered apparatus as described in the item 10 above is employed, the rotor may be accommodated in an enclosed container under reduced pressure and the polygon mirror's resistance against air may thus be reduced.

As explained above, various effects may be provided according to the present invention.

The present invention has been explained in detail by referring to particular embodiments. However, the present invention is not limited to those explained, and it may be changed or modified within the sprit and scope of the present invention which is defined in the Claims appended hereto.

What is claimed is:

1. An electrically powered apparatus comprising:
a stator having a stator coil means and a stator end surface;
a rotor having a sliding end surface opposed to said stator end surface and mounted for coaxial rotation relative to said stator and having permanent magnet means with a plurality of poles in spaced opposed relation to said coil means of said stator with a magnetic gap therebetween, said stator end surface having a stator bearing surface as a part thereof, said rotor having said rotor sliding end surface in sliding engagement with said stator bearing surface, said rotor sliding surface and said stator bearing surface being of hard ceramic materials, one of said rotor sliding surface and said stator bearing surface being a smooth plane and the other of said surfaces having a plurality of grooves therein for generating fluid dynamic pressure upon rotation of said rotor, opposed recesses being provided in locations along the axis of rotation on said rotor sliding end surface and said stator bearing surface, and a hard material member is accommodated within the space defined by the two oppositely facing recesses provided respectively in said surfaces so as to prevent relative radial movement of said rotor sliding end surface and stator bearing surface while permitting relative rotation therebetween, whereby said rotor can be a driven member of said apparatus thereon driven in rotation relative to said stator.

2. An electrically powered apparatus as claimed in claim 1, wherein the ceramic material used for said stator bearing surface is either α-SiC containing BeO, or $Si_3N_4$ or β-SiC.

3. An electrically powered apparatus comprising:
a stator having a stator coil means and a stator end surface;
a rotor having sliding end surfaces on opposite sides thereof, one rotor sliding end surface being opposed to said stator end surface, said rotor being mounted for coaxial rotation relative to said stator and having permanent magnet means with a plurality of poles in spaced opposed relation to said coil means of said stator with a magnetic gap therebetween, said stator end surface having a stator bearing surface as a part thereof, said rotor having said rotor sliding end surface in sliding engagement with said stator bearing surface;
a rockable bearing surface opposed to the other rotor sliding end surface, said two rotor sliding surfaces, said stator bearing surface and said rockable bearing surface being of hard ceramic materials, one of said one rotor sliding surface and said stator bearing surface being a smooth plane and the other having a plurality of grooves therein for generating fluid dynamic pressure upon rotation of said rotor, one of said other rotor sliding surface and said rockable bearing surface being a smooth plane and the other having a plurality of grooves therein for generating fluid dynamic pressure upon rotation of said rotor, opposed recesses being provided in locations along the rotary axis of the respective surfaces of said stator bearing surface and said rotor sliding surface which faces said stator bearing surface and said rotor sliding surface which faces said rockable bearing surface, and a hard member adapted to support said stator bearing surface and the rotor sliding surface is accommodated in the spaces defined by the respective pairs of recesses which face each other so as to prevent relative radial movement of said rotor, said stator and said rockable bearing surface.

4. An electrically powered apparatus as claimed in claim 3, wherein the ceramic material used for said stator bearing surface is made either of α-SiC containing BeO or $Si_3N_4$ or β-SiC.

5. An electrically powered apparatus as claimed in any of claims 3, wherein the outer peripheral surface of said rotor is provided with a polyhedral mirror.

* * * * *